MAGNETIC CORE COMPUTING CIRCUIT

Filed Dec. 2, 1957

INVENTORS:
Edward Fabiszewski
and Louis Otiari,
BY Bair, Freeman & Molinare
ATTORNEYS.

3,040,987

MAGNETIC CORE COMPUTING CIRCUIT

Edward S. Fabiszewski, Lexington, and Louis G. Oliari, Brockton, Mass., assignors to Minneapolis-Honeywell Regulator Company, Minneapolis, Minn., a corporation of Delaware Filed Dec. 2, 1957, Ser. No. 700,124
13 Claims. (Cl. 235—176)

This invention relates generally to new and improved data processing apparatus, and more particularly to new and improved electronic computing apparatus for effecting the addition of binary digits.

Data processing systems are known in the art in which electrical pulses representing digital information are processed in the binary form of notation, i.e., in groups of time spaced bits or pulse positions in which there is an electrical pulse for each bit representing a binary "one" and no electrical pulse for each bit representing a binary "zero."

It is a general object of this invention to provide new and improved computing apparatus for effecting the addition of binary represented numbers.

More specifically, it is an object of this invention to provide an improved binary adder comprised of bi-stable logical elements.

It is another object of this invention to provide an improved binary adder adapted to add the binary digits of a plurality of binary represented numbers, wherein the digits of each number are fed into the adder in serial fashion, and the different numbers are applied to the adder in parallel.

It is still another object of this invention to provide an improved binary adder in which each binary number to be added is fed into the adder in serial fashion to be combined with the sub-total stored in the adder.

It is a further object of this invention to provide an improved binary adder which comprises a binary "ones" generator formed in a carry circuit and adapted to be selectively started and stopped in accordance with the nature of the digits applied to the input of the adder.

It is a still further object of this invention to provide an improved binary adder, as described above, which is characterized by its accuracy, its flexibility, and the relative economy of components required.

These and other objects are realized in accordance with the features of a specific illustrative embodiment of the invention which comprises a plurality of bi-stable elements arranged to perform a logical addition function. Advantageously, the bi-stable elements may take the form of magnetic cores comprised of core material having a rectangular hysteresis loop with a large residual flux characteristic. Such magnetic cores have two stable states of magnetization, and therefore, have found great utility in digital data processing systems. In particular, such magnetic cores have found widespread use in those systems employing the binary numbering system wherein the presence or absence of a pulse serves to indicate a binary "one" or "zero."

Although magnetic cores of the above-described type are shown in the specific embodiment illustrated herein, it will be understood by those skilled in the art that other types of bi-stable elements capable of performing logical functions may be used in the binary adder with equally satisfactory results.

The magnetic cores of the illustrative embodiment are each provided with an enabling input winding, an inhibit input winding, an output winding, and a shift winding in the manner known in the art. The digits of one binary number to be added are fed serially to the enabling input winding of a first input magnetic core and the digits of a second number, which may be either a second factor or the sub-total stored in the adder, are fed serially to the enabling input winding of a second input magnetic core. The digits of the first and second binary number also are fed to the inhibit windings of the second and first input magnetic cores respectively, such that the presence of a binary "one" digit on either input core serves to inhibit the switching action of the other input core.

The output windings of the first and second input magnetic cores are connected to the respective enabling input windings of a pair of buffer magnetic cores and to the enabling input winding and inhibit input winding respectively, of a "ones" generator magnetic core in the carry circuit. The output windings of the buffer cores are connected in parallel to the enabling input winding of a first output core, and to the inhibit input winding of a second output core.

Also, the output of the "ones" generator magnetic core is connected through a buffer core to the inhibit winding of the first output core and to the enabling winding of the second output core. The output windings of the first and second output cores are connected in parallel to the output line of the adder in the embodiment where two binary numbers are applied to the adder, or to a feedback line connected to the input of the second input magnetic core in the embodiment where each binary number is added to the stored subtotal.

In accordance with further features of this invention as described in greater detail below, the "ones" generator in the carry circuit is set whenever the negation of the two binary number digits are present on the input, and the "ones" generator is reset whenever both binary digits are present on the input. Thus, it is an important aspect of this invention that the carry circuit of the logical binary adder includes a "ones" generator that is selectively started and stopped in accordance with the nature of the digits applied to the input of the circuit.

The above and other features of novelty which characterize the invention are pointed out with particularity in the claims appended to and forming a part of this specification. For a better understanding of this invention, however, its advantages and specific objects attained by its use, reference is had to be accompanying drawing and descriptive material in which is shown and described several illustrative embodiments of the invention.

Figures 1, 2, 3:
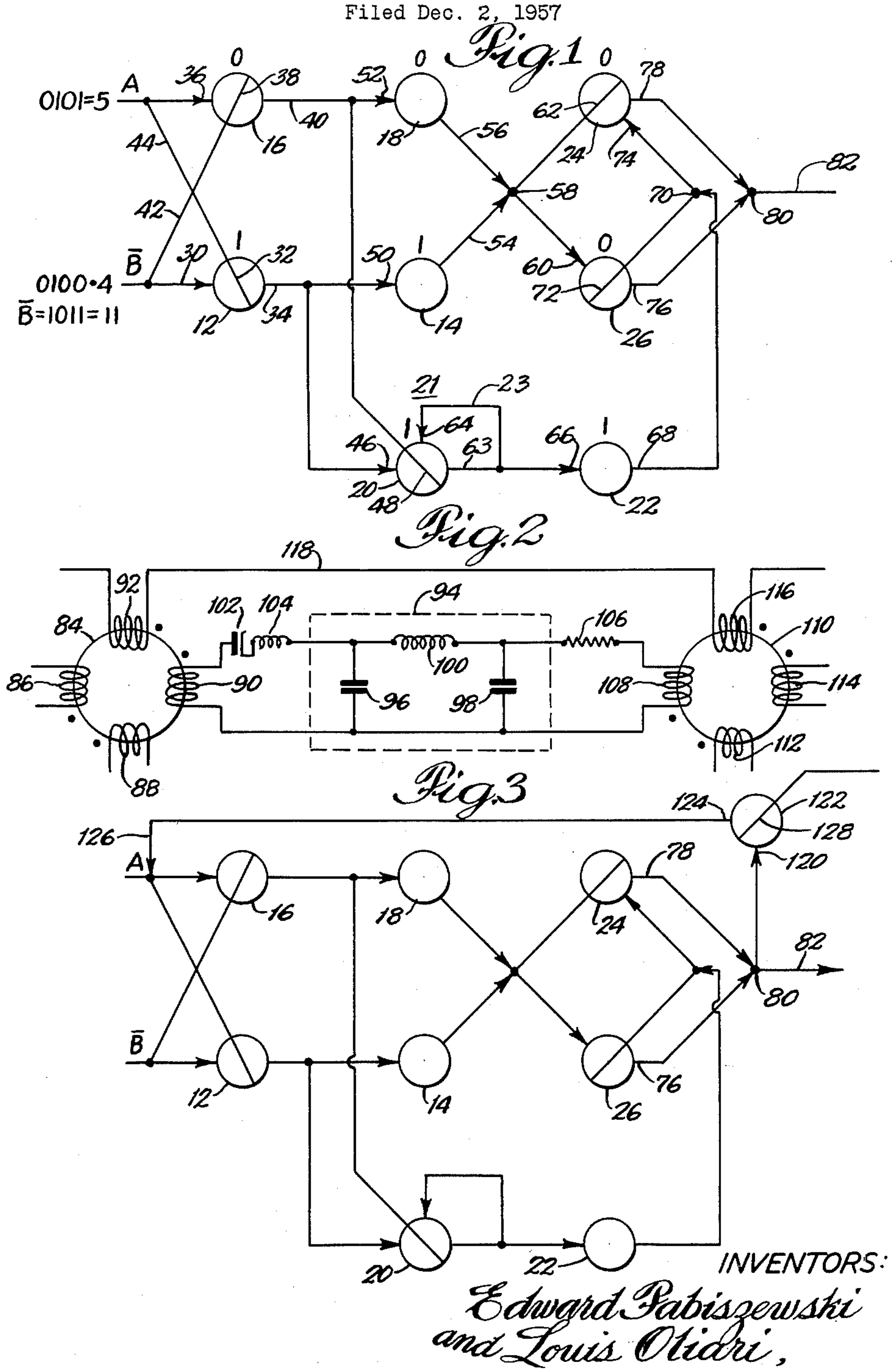
FIGURE 1 is a functional schematic diagram of one embodiment of binary adder in accordance with the invention.
FIGURE 2 is a schematic drawing of a magnetic core circuit which advantageously may be utilized in the invention.
FIGURE 3 is a functional schematic diagram of another embodiment of binary adder in accordance with the invention.

Referring now to the drawing and more particularly to FIGURE 1, there is shown in symbolic diagram form a logical binary adder embodying principles of the invention which comprises a plurality of bi-stable elements arranged to provide addition of a pair of binary numbers A and B applied thereto. Each binary element, which advantageously may be a magnetic core of the type having a rectangular hysteresis loop with a large residual flux characteristic, is provided with shift, enabling, inhibit, and output conductors in the manner well known in the art.

Thus, the logical binary adder of FIGURE 1 is shown as comprising a first input bi-stable element 12 having an enabling conductor 30, an inhibit conductor 32 and an output conductor 34. A second input bi-stable element 16 is provided, also having an enabling conductor 36, an inhibit conductor 38 and an output conductor 40.

The binary numbers to be added, A and B, each are formed of a plurality of binary digits represented by binary "ones" or "zeros" which are applied in serial fashion to the input conductors 36 and 30 of the input bi-stable elements 16 and 12, respectively. In addition, the binary digits of the B number are applied by means of conductor 42 to the inhibit conductor 38 of bi-stable element 16, and the binary digits of the A number are applied by means of conductor 44 to the inhibit conductor 32 of the input bi-stable element 12.

In accordance with the known characteristics of the bi-stable elements 12 and 16, it will be understood that whenever a "ones" digit is applied to both input bi-stable elements 12 and 16, these bi-stable elements will be inhibited with the result that no output signal will be present on their output conductors. On the other hand, whenever a binary "one" digit appears on one of the enabling conductors and a "zero" digit is present on the other enabling conductor, the input bi-stable element having the binary "one" digit on its enabling conductor will be switched to its opposite state of magnetization.

As shown in FIGURE 1, the input bi-stable elements 12 and 16 are connected to a carry circuit which includes a "ones" generator 21. The output conductor 34 of input bi-stable element 12 is connected to the enabling conductor 46 of the "ones" generator bi-stable element 20, which advantageously also may take the form of a bi-stable magnetic core. The "ones" generator 21 may be of the type which, when an enabling pulse is applied thereto, will be set. When a shift pulse is then applied thereto, the core will be reset and the signal will be shifted out of the core. The output signal is then fed back to an enabling winding on the core to once again set the core. Thus, each time a shift pulse is applied, a "one" will appear at the output; hence, the term "ones" generator. The output conductor 40 of the input bi-stable element 16 is connected to the inhibit conductor 48 of the "ones" generator element 20. Further, output conductor 34 of the bi-stable element 12 is connected to the enabling conductor 50 of a buffer bi-stable element 14, and output conductor 40 of bi-stable element 16 is connected to the enabling conductor 52 of the buffer bi-stable element 18.

The output conductors 54 and 56, respectively, of the buffer bi-stable elements 14 and 18 are connected to a common junction point 58 which in turn is connected to the enabling conductor 60 of an output bi-stable element 26 and the inihibit conductor 62 of an output bi-stable element 24.

The output conductors 63 of the "ones" generator element 20 is connected by means of a suitable feed-back conductor to an enabling conductor 64 of bi-stable element 20, and also connected to the enabling conductor 66 of a buffer bi-stable element 22. The output conductor 68 of the buffer bi-stable element 22 is connected to a common junction point 70, which in turn, is connected to the inhibit conductor 72 of the output bi-stable element 26 and the enabling conductor 74 of the output bi-stable element 24. Advantageously, the buffer bi-stable elements 14, 18 and 22 and the output bi-stable elements 24 and 26 may also take the form of magnetic cores of the type having a rectangular hysteresis loop as described above The manner in which the buffer core circuits and their windings may be interconnected is illustrated and described in an article by Guterman et al. entitled "Logical and Control Functions Performed With Magnetic Cores" from the Proceedings of the I.R.E., March 1955, starting at page 291.

The output conductor 76 of the output bi-stable element 26 and the output conductor 78 of the output bi-stable element 24 are connected to a common junction point 80, which in turn, is connected to the output line 82 of the binary adder circuit.

In the operation of the binary adder shown in FIGURE 1, the corresponding digits of the A and B numbers are applied in serial fashion to their respective input bi-stable elements at a rate corresponding to the clock rate or pulse repetition rate of the circuit. As each pair of binary digits of numbers A and B are applied to the input, the information stored in the circuit is shifted out of the bi-stable elements in which they were previously stored to succeeding bi-stable elements in accordance with the nature of the digits and the logic of the circuit. This shifting is accomplished by way of shift pulses produced by a shift pulse source, not shown. The shift windings on each of the bistable elements may be as shown in FIGURE 2.

In accordance with a novel aspect of this invention, the ones generator 21 in the carry circuit is started and stopped in accordance with the nature of the binary digits applied to the input bi-stable elements 12 and 16. The output of bi-stable element 12 is connected to the enabling input 46 of the ones generator bi-stable element 20 and the output of bi-stable element 16 is connected to the inhibit input 48 of the ones generator element. The output 63 of the ones generator element is fed back into the element at the enabling input 64.

Thus, when neither of the input binary digits is a binary "one" the ones generator is set and produces carry digits at its output. When the A input digit is a binary "one" and the B input digit is a binary "zero," the ones generator will be inhibited and stopped. The generator 21 will be inhibited for the reason that the "one" on the A input will be read into the core 16 and then shifted out to the inhibit input 48 on core 20. This will keep the core from setting by way of the enabling feedback signal input 64. When binary "one" digits appear at both the A and B inputs, the carry ones generator will be reset.

The operation of the circuit shown in FIGURE 1 can be explained by an example showing the addition of two binary numbers. Thus, if the adder circuit is used to add a decimal 5, 0101 in binary, to a decimal 4, 0100 in binary, the result on output line 82 would be a decimal 9, or a binary 1001. Consider the binary 0101 number as being applied to the A input and the negation of the binary 0100 number as being applied to the B input. Since the negation of the B number will be 1011, the B input will be represented as $\overline{B}$. The use of the $\overline{B}$ input, or the component of B, is for purposes of minimizing the number of cores used in the adder circuit. Logically, the $\overline{B}$ signals are recomplemented within the circuit so that the net result is the adding of the operands A and B.

The following truth table will show the settings of the particular bi-stable elements in the circuit at the various pulse periods in the performance of this exemplary addition problem. Thus, at time T0, that is before the first A and $\overline{B}$ digits are applied to the circuit, the truth table shows that the bi-stable elements 12, 14, 20 and 22 will all have binary "ones" stored therein and the bi-stable elements 16, 18, 24 and 26 all will have binary "zeros" stored therein. This is further shown in FIGURE 1 by the digits appearing above each bi-stable element. The setting of the elements 12, 14, 20, and 22 may be effected by loading set signals into the $\overline{B}$ input line prior to the computation. These set signals are then shifted into the circuit so as to set each of the cores 12, 14, 20, and 22.

In the manner explained above, as the corresponding pairs of binary digits are applied to the input bi-stable elements 12 and 16, the information in the adder is shifted in accordance with the time designations, T1, T2, T3, etc., shown at the left of the truth table. The shifting signals are applied to all of the cores of the circuit on windings, not shown. The timing of the shift signals may be considered as defining the time designations in the following truth table.

| | 12 | 14 | 16 | 18 | 20 | 22 | 24 | 26 | Out | |
|---|---|---|---|---|---|---|---|---|---|---|
| T0 | 1 | 1 | 0 | 0 | 1 | 1 | 0 | 0 | 0 | |
| T1 | 0 | 1 | 0 | 0 | 1 | 1 | 0 | 0 | 0 | |
| T2 | 1 | 0 | 0 | 0 | 1 | 1 | 0 | 0 | 0 | |
| T3 | 0 | 1 | 1 | 0 | 1 | 1 | 1 | 0 | 0 | |
| T4 | 1 | 0 | 0 | 1 | 0 | 1 | 0 | 0 | 1 | Answer |
| T5 | 1 | 1 | 0 | 0 | 1 | 0 | 0 | 0 | 0 | Answer |
| T6 | 1 | 1 | 0 | 0 | 1 | 1 | 0 | 1 | 0 | Answer |
| T7 | 1 | 1 | 0 | 0 | 1 | 1 | 0 | 0 | 1 | Answer |

Thus, it can be seen that the logical adder of the invention produces the sum of the A and B numbers by feeding A and $\overline{B}$ into bi-stable elements 12 and 16. Accordingly, the application of numbers 0101 and 1011 (the negation of 0100) results in 1001 being produced on output line 82.

As stated above, the bi-stable elements comprising the logical adder may take the form of magnetic cores having rectangular hysteresis loops with large residual flux characteristics. FIGURE 2 shows an illustrative magnetic core stage of the type disclosed in the co-pending application of E. M. Ziolkowski, Serial No. 645,839, now Patent No. 2,899,536, filed March 13, 1957, which advantageously may be used in the present invention. This illustrative magnetic core stage comprises a magnetic core 84 upon which is wound a pair of input windings 86 and 88, an output winding 90 and a shift winding 92. In the illustrative embodiment of the invention, as described above, input winding 86 serves as an enabling winding and input winding 88 serves as the inhibit winding. As will be apparent the need for an inhibit winding is not present on all of the cores.

A delay link 94 is coupled to the output winding 90 and comprises a pair of condensers 96 and 98 with a choke coil 100 connected therebetween. A diode 102 and a choke coil 104 are connected between output winding 90 and one input terminal of the delay link 94. A resistor 106 is connected in series between the output of the delay link 94 and the enabling winding 108 of a further magnetic core 110. Thus, the output of the delay link 84 feeds into winding 108 of magnetic core 110 which also is provided with an inhibit winding 112, an output winding 114, and a shift winding 116, the latter being driven together with shift winding 92 form a common shift pulse source connected to the shift line 118.

In order to illustrate the operation of the circuit shown in FIGURE 2, it will be assumed that an input pulse is applied to the input winding 86 of core 84 and that this input pulse is polarized to switch the residual flux of core 84 so that after the input pulse is removed, the residual flux will be in the "one" state of magnetization. As soon as a shift pulse is applied to shift winding 92 over the shift line 118, the pulse causes the flux in the core 84 to switch to the opposite or "zero" state of magnetization where it remains after the shift pulse is removed.

When the magnetic core 84 is switched from the "one" state of magnetization to the "zero" state of magnetization, there is a large change of flux, and as a result, there is a relatively large output signal proportional to this total flux change produced in the output winding 90 of core 84.

This output signal from core 84 is fed through the delay link 94 to the succeeding core 110 where it has the effect of switching the core 110 to its opposite state of magnetization. It will be understood that the incorporation in the delay link 94 of suitable frequency discriminating means serves to minimize unwanted signals, such as signal reflections and signals resulting from shifting core 84 from the "zero" to the "one" state. It further will be apparent to those skilled in the art that other forms of magnetic core circuits may satisfactorily be used in the logical adder of FIGURE 1 in lieu of the illustrative magnetic core stage shown in FIGURE 2, as for example, the transistor-core devices of the type described in the co-pending application of S. Guterman, entitled Magnetic Computer, Serial No. 471,319, filed November 26, 1956.

In the alternative logical adder embodiment shown in FIGURE 3, the common junction point 80 of the output conductors 76 and 78 of output bi-stable elements 26 and 24, respectively, is connected to the enabling conductor 120 of a feedback control bi-stable element 122. The output conductor 124 of the feedback control bi-stable element 122 is connected by means of a feedback line 126 to the A input such that the circuit serves to provide binary addition to the digits applied to the B input to the subtotal stored in the adder and applied to the A input over the feedback line 126.

If desired the feedback control bi-stable element 122 may be provided with an inhibit conductor 128 to the end that selected digits appearing at the output line 82 of the adder may be inhibited by way of a timing bit fed to the inhibit conductor 128 of bi-stable element 122. In a particular embodiment of the novel binary adder disclosed herein, as described in the co-pending application of E. S. Fabiszewski, Serial No. 757,840, filed August 28, 1958, inhibit timing bits are applied on inhibit conductor 128 of bi-stable element 122 so that all of the $2^3$ digits appearing in the output line are inhibited, thus preventing feedback of the weight 8 bit.

The logical equations for the binary adder described above in FIGURE 3 are as follows:

$$((\overline{A}\cdot\overline{B})\cdot CR)V((A\cdot B)\cdot CR)V((A\cdot\overline{B}\cdot\overline{CR})V(\overline{A}\cdot B\cdot\overline{CR}))$$
$$((\overline{A}\cdot\overline{B})V(A\cdot B))\cdot CR)V((A\cdot\overline{B})V(\overline{A}\cdot B))\cdot\overline{CR})=$$
$$A\cdot B \text{ carry is set } = CR$$
$$\overline{A}\cdot\overline{B} \text{ carry is reset} = \overline{CR}$$

A and B are the operands on the input of the adder, while CR designates a carry.

It will be understood by those skilled in the art that modifications may be made in the construction and arrangement of the specific illustrative embodiments of logical binary adders described above without departing from the real purpose and spirit of the invention, and that the invention is to be limited solely by the scope of the appended claims.

What is claimed as the invention is:

1. A serial binary adder comprising first and second input bistable elements each having enabling, inhibit, timing and output conductors, means for applying each binary number to be added, with one binary number being in its complemented form, to the enabling conductor of one of said bistable elements and to the inhibit conductor of the other bistable element; a "ones" generator comprising a third bistable element having enabling, inhibit, timing and output conductors; means connecting the output conductor of said first input bistable element to an enabling conductor of said "ones" generator; means connecting the output conductor of said second input bistable element to the inhibit conductor of said "ones" generator; first and second output bistable elements each having enabling, inhibit, timing and output conductors, buffer means connecting the output conductors of said first and second input bistable elements to the enabling conductor of said first output bistable element and to the inhibit conductor of said second output bistable element; and buffer means connecting the output conductor of said "ones" generator to the enabling conductor of said second output bistable element and to the inhibit conductor of said first output bistable element, one of said input bistable elements, the buffer means at the output thereof, the "ones" generator, and the buffer means at the output thereof being preset to a digit indicating condition prior to the computing operation.

2. A serial binary adder comprising a pair of input elements each having enabling output, timing and inhibit conductors, means for applying each binary number to be added, with one binary number being in its complemented form, to the enabling conductor of one input element and to the inhibit conductor of the other input element; a "ones" generator having enabling output, timing and inhibit conductors; means connecting the output of said one input element to an enabling conductor of said "ones" generator; means connecting the output of the other input element to the inhibit conductor of said "ones" generator; a pair of output elements each having enabling output, timing and inhibit conductors, buffer means connecting the outputs of said input elements to the enabling conductor of one of said output elements and to the inhibit conductor of the other of said output elements; and buffer means connecting the output of said "ones" generator to the enabling conductor of said other output element and to the inhibit conductor of said one output element, one of said input elements, the buffer means at the output thereof, the "ones" generator and the buffer means at the output thereof being preset to a digit indicating condition prior to the computing operation.

3. A binary adder comprising a pair of input magnetic cores, each having enabling, inhibit, shift and output windings, means for applying each binary number to be added, with one binary number being in its complemented form, to the enabling winding of one magnetic core and to the inhibit winding of the other magnetic core; a third magnetic core having enabling, inhibit, shift and output windings; means connecting the output windings of said pair of input magnetic cores to the enabling and inhibit windings, respectively, of said third magnetic core; a pair of output magnetic cores each having enabling, inhibit, shift and output windings, buffer means connecting the output windings of said pair of input magnetic cores to the enabling and inhibit windings, respectively, of said pair of output magnetic cores; and buffer means connecting the output winding of said third magnetic core to the inhibit and enabling windings respectively, of said pair of output magnetic cores, one of said input magnetic cores, the buffer means at the output thereof, the third magnetic core and the buffer means at the output thereof being preset to a digit indicating condition prior to the computing operation.

4. A serial binary adder comprising first and second input bistable elements each having enabling, inhibit, timing and output conductors, means for applying each binary number to be added, with one binary number being in its complemented form, to the enabling conductor of one of said bistable elements and to the inhibit conductor of the other bistable element; a "ones" generator comprising a third bistable element having enabling, inhibit, timing and output conductors; means connecting the output conductor of said first input bistable element to an enabling conductor of said "ones" generator; means connecting the output conductor of said second input bistable element to the inhibit conductor of said "ones" generator; first and second output bistable elements each having enabling, inhibit, timing and output conductors, buffer means connecting the output conductors of said first and second input bistable elements to the enabling conductor of said first output bistable element and to the inhibit conductor of said second output bistable element; buffer means connecting the output conductor of said "ones" generator to the enabling conductor of said second output bistable element and to the inhibit conductor of said first output bistable element, a feedback bistable element having enabling, inhibit, timing and output conductors, means connecting the output conductors of said first and second output bistable elements to the enabling conductor of said feedback bistable element, and means connecting the output conductor of said feedback bistable element to the enabling conductor of one of said input bistable elements, one of said input bistable elements, the buffer means at the output thereof, the "ones" generator and the buffer means at the output thereof being preset to a digit indicating condition prior to the computing operation.

5. A binary adder comprising a pair of input elements each having enabling, output, timing and inhibit conductors, means for applying each binary number to be added, with one binary number being in its complemented form, to the enabling conductor of one input element and to the inhibit conductor of the other input element; a "ones" generator having enabling, output, timing and inhibit conductors; means connecting the output of said one input element to an enabling conductor of said "ones" generator; means connecting the output of the other input element to the inhibit conductor of said "ones" generator; a pair of output elements each having enabling, output, timing and inhibit conductors, buffer means connecting the outputs of said input elements to the enabling conductor of one of said output elements and to the inhibit conductor of the other of said output elements; buffer means connecting the output of said "ones" generator to the enabling conductor of said other output element and to the inhibit conductor of said one output element, a feedback element having enabling, output, timing and inhibit conductors, means connecting the outputs of said pair of output elements to the enabling conductor of said feedback element, and means connecting the output of said feedback element to the enabling conductor of one of said input elements, one of said input elements, the buffer means at the output thereof, the "ones" generator and the buffer means at the output thereof being preset to a digit indicating condition prior to the computing operation.

6. A binary adder comprising a pair of input magnetic cores each having enabling, inhibit, shift and output windings, means for applying each binary number to be added, with one binary number being in its complemented form to the enabling winding of one magnetic core and to the inhibit winding of the other magnetic core; a third magnetic core having enabling, inhibit, shift and output windings; means connecting the output windings of said pair of input magnetic cores to the enabling and inhibit windings, respectively of said third magnetic core; a pair of output magnetic cores each having enabling, inhibit, shift and output windings, buffer means connecting the output windings of said pair of input magnetic cores to the enabling and inhibit windings, respectively, of said pair of output magnetic cores, buffer means connecting the output winding of said third magnetic core to the inhibit and enabling windings, respectively, of said pair of output magnetic cores, a feedback magnetic core having enabling, inhibit, shift and output conductors, means connecting the output conductors of said output magnetic cores to the enabling conductor of said feedback magnetic core, and means connecting the output conductor of said feedback magnetic core to the enabling conductor of one of said input magnetic cores, one of said input magnetic cores, the buffer means at the output thereof, the third magnetic core and the buffer means at the output thereof being preset to a digit indicating condition prior to the computing operation.

7. A logical computing circuit for the addition of a pair of binary numbers, A and B, comprising first and second input bistable elements having enabling, timing, inhibit and output conductors; means for applying binary number A to said first input bistable element; means for applying $\overline{B}$, the complement of binary number B, to said second input bistable element, means interconnecting said first and second input bistable elements for inhibiting either input bistable element each time a binary digit is applied to the other input bistable element, a carry circuit including a "ones" generator connected to the output of said first and second bistable elements, said "ones" generator comprising a bistable element adapted to be set whenever $\overline{A}$, the complement of binary number A, and $\overline{B}$ binary digits are applied to said input bistable elements and to be reset whenever A and B binary digits are applied to said input bistable elements, a pair of output bistable elements and buffer means operatively connecting said pair of output bistable elements to the output of said input bistable elements, and to said carry circuit for providing an output binary number in accordance with the sum of said A and B binary numbers applied to the computing circuit, said buffer means connecting the enabling and inhibit inputs of one output bistable element to the outputs of said input bistable elements and to the output of said "ones" generator, and further connecting the enabling and inhibit inputs to the other output bistable element to the output of said "ones" generator and to the outputs of said input bistable elements; one of said input bistable elements, the buffer means at the output thereof, the "ones" generator and the buffer means at the output thereof being preset to a digit indicating condition prior to the computing operation.

8. A logical computing circuit for the addition of a pair of binary numbers, A and B, comprising first and second input bistable elements having enabling, timing, inhibit and output conductors; means for applying binary number A to said first input bistable element; means for applying $\overline{B}$, the complement of binary number B, to said second input bistable element, means interconnecting said first and second input bistable elements for inhibiting either input bistable element each time a binary digit is applied to the other input bistable element, a carry circuit including a "ones" generator connected to the output of said first and second bistable elements, said "ones" generator comprising a bistable element adapted to be set whenever $\overline{A}$, the complement of binary number A, and $\overline{B}$ binary digits are applied to said input bistable elements and to be reset whenever A and B binary digits are applied to said input bistable elements, a pair of output bistable elements, buffer means operatively connecting said pair of output bistable elements to the output of said input bistable elements, and to said carry circuit for providing an output binary number in accordance with the sum of said A and B binary numbers applied to the computing circuit, said buffer means connecting the enabling and inhibit inputs of one output bistable element to the outputs of said input bistable elements and to the output of said "ones" generator, and further connecting the enabling and inhibit inputs of the other output bistable element to the output of said "ones" generator and to the outputs of said input bistable elements, a feedback bistable element, and means connecting said feedback bistable element between said output bistable elements and one of said input bistable elements for causing the output of said computing circuit to be re-entered into the input of the computing circuit, one of said input bistable elements, the buffer means at the output thereof, the "ones" generator and the buffer means at the output thereof being preset to a digit indicating condition prior to the computing operation.

9. A computing circuit for the addition of a pair of binary numbers A and B, comprising a pair of input magnetic cores having enabling, shift, inhibit and output conductors, means for applying binary number A to one of said input magnetic cores and for applying $\overline{B}$, the complement of binary number B, to the other of said input magnetic cores, means interconnecting said input magnetic cores such that either magnetic core is inhibited each time a binary digit is applied to the other input magnetic core, a carry circuit including a "ones" generator connected to the output of said input magnetic cores, said "ones" generator comprising a magnetic core adapted to be set whenever $\overline{A}$, the complement of binary number A, and $\overline{B}$ binary digits are applied to the input magnetic cores and to be reset whenever A and B binary digits are applied to the input magnetic cores, buffer means, and a pair of output magnetic cores operatively connected by said buffer means to the output of said input magnetic cores and to said carry circuit for providing an output binary number in accordance with the sum of said A and B binary numbers applied to the computing circuit, said output magnetic cores each comprising enabling, shift, output, and inhibit windings, the enabling and inhibit windings of one output magnetic core being connected by said buffer means to the outputs of said input magnetic cores and to the output of said carry circuit, respectively, the enabling and inhibit windings of the other output magnetic core being connected by said buffer means to the output of said carry circuit and to the outputs of said input magnetic cores, respectively; one of said input magnetic cores, the buffer means at the output thereof, the carry circuit and the buffer means at the output thereof being preset to a digit indicating condition prior to the computing operation.

10. A computing circuit for the addition of a pair of binary numbers A and B in accordance with claim 9 wherein the magnetic core of said "ones" generator comprises an enabling winding connected to the output of one of said input magnetic cores, an inhibit winding connected to the output of the other of said input magnetic cores, a shift winding, an output winding and another enabling winding connected to said output winding.

11. A computing circuit for the addition of a pair of binary numbers, A and B, comprising a pair of input magnetic cores having enabling, shift, inhibit and output conductors, means for applying binary number A to one of said input magnetic cores, and for applying $\overline{B}$, the complement of binary number B, to the other of said input magnetic cores, means interconnecting said input magnetic cores such that either magnetic core is inhibited each time a binary digit is applied to the other input magnetic core, a carry circuit including a "ones" generator connected to the output of said input magnetic cores, said "ones" generator comprising a magnetic core adapted to be set whenever $\overline{A}$, the complement of binary number A, and $\overline{B}$ binary digits are applied to the input magnetic cores and to be reset whenever A and B binary digits are applied to said input magnetic cores, buffer means, a pair of output magnetic cores, each having enabling, shift, inhibit and output conductors operatively connected by said buffer means to the output of said input magnetic cores and to said carry circuit for providing an output binary number in accordance with the sum of said A and B binary numbers applied to the computing circuit, said buffer means connecting the enabling and inhibit inputs of one output magnetic core to the outputs of said input magnetic cores and to the output of said "ones" generator, respectively, and further connecting the enabling and inhibit inputs of the other output magnetic core to the output of said "ones" generator and to the outputs of said input magnetic cores, respectively, a feedback bistable element, and means connecting said feedback bistable element between said output magnetic cores and one of said input magnetic cores for causing the output of said computing circuit to be re-entered into the input of said computing circuit, one of said input magnetic cores, the buffer means at the output thereof, the carry circuit and the buffer means at the output thereof being preset to a digit indicating condition prior to the computing operation.

12. A computing circuit comprising a pair of input magnetic cores for receiving the digits of the binary numbers to be added, with one binary number being in its complemented form, buffer means, a pair of output magnetic cores operatively connected by said buffer means to the output of said input magnetic cores, said pair of output magnetic cores having a common output, and a carry circuit connected by said buffer means to said input magnetic cores and said output magnetic cores, said carry circuit including a "ones" generator which is selectively started and stopped to control said output magnetic cores in accordance with the binary digits applied to said input magnetic cores, each of said magnetic cores having enabling, shift, inhibit and output windings, said buffer means connecting the enabling and inhibit inputs of one output magnetic core to the outputs of said input magnetic cores and to the output of said "ones" generator, respectively, and further connecting the enabling and inhibit inputs of the other output magnetic core to the output of said "ones" generator and to the outputs of said input bistable elements, respectively; one of said input magnetic cores, the buffer means at the output thereof, the "ones" generator and the buffer means at the output thereof being preset to a digit indicating condition prior to the computing operation.

13. A computing circuit in accordance with claim 12 further comprising a feedback magnetic core, means connecting said feedback magnetic core between the output of said output magnetic cores and the input of one of said input magnetic cores, and inhibit means associated with said feedback magnetic core for selectively controlling the binary digits fed back from the output to the input of said computing circuit.

References Cited in the file of this patent

UNITED STATES PATENTS

| | | |
|---|---|---|
| 2,643,820 | Williams et al. | June 30, 1953 |
| 2,755,459 | Carbrey | July 17, 1956 |
| 2,776,380 | Andrews | Jan. 1, 1957 |
| 2,781,504 | Canepa | Feb. 12, 1957 |
| 2,805,020 | Lanning | Sept. 3, 1957 |
| 2,851,219 | Hussey | Sept. 9, 1958 |
| 2,852,699 | Ruhman | Sept. 16, 1958 |

OTHER REFERENCES

Auerbach et al.: The Binac, Proceedings of the I.R.E., January 1952, pp. 19, 20.

Haynes: Magnetic Cores as Elements of Digital Computing Systems, Thesis, Univ. of Illinois, Urbana, Ill., 1950, pp. 50 to 56, 64 to 68.

Guterman et al.: Logical and Control Functions Performed With Magnetic Cores, Proceedings of the I.R.E., March 1955, pp. 291 to 298.